US012029992B2

(12) United States Patent
Ciesinski

(10) Patent No.: US 12,029,992 B2
(45) Date of Patent: Jul. 9, 2024

(54) BOUNCY CASTLE GROUNDING ASSEMBLY

(71) Applicant: Jeremy Ciesinski, Ottawa (CA)

(72) Inventor: Jeremy Ciesinski, Ottawa (CA)

( * ) Notice: Subject to any disclaimer, the term of this patent is extended or adjusted under 35 U.S.C. 154(b) by 344 days.

(21) Appl. No.: 17/669,110

(22) Filed: Feb. 10, 2022

(65) Prior Publication Data

US 2023/0249090 A1 Aug. 10, 2023

(51) Int. Cl.

| | |
|---|---|
| ***A63G 31/12*** | (2006.01) |
| ***A63B 5/00*** | (2006.01) |
| ***H05F 3/02*** | (2006.01) |

(52) U.S. Cl.
CPC ................ *A63G 31/12* (2013.01); *A63B 5/00* (2013.01); *H05F 3/02* (2013.01); *A63B 2225/62* (2013.01)

(58) Field of Classification Search
CPC .......... A63G 31/00; A63G 31/12; A63B 5/00; H05F 3/02
USPC .......................................................... 472/134
See application file for complete search history.

(56) References Cited

U.S. PATENT DOCUMENTS

| | | | | |
|---|---|---|---|---|
| 2,943,242 | A | 6/1960 | Schascl | |
| 4,460,804 | A | 7/1984 | Svejkovsky | |
| 4,698,724 | A | 10/1987 | Burvee | |
| 4,802,056 | A | 1/1989 | Aronson | |
| D511,363 | S | 11/2005 | Nicholson | |
| 8,465,834 | B2 | 6/2013 | Kim | |
| 9,598,179 | B2 | 3/2017 | Prevost | |
| 2015/0138728 | A1* | 5/2015 | Campbell | G08B 5/36 361/679.57 |
| 2017/0219176 | A1* | 8/2017 | Chang | A63J 5/025 |
| 2021/0267040 | A1* | 8/2021 | Burson | F16C 11/04 |

* cited by examiner

*Primary Examiner* — Kien T Nguyen

(57) ABSTRACT

A bouncy castle grounding assembly for discharging static electricity from a bounce house includes a bounce house which has an inflation tube for inflating the bounce house. A fan is fluidly attachable to the inflation tube to blow air into the bounce house for inflating the bounce house. A grounding band is positionable around the inflation tube and the grounding band is comprised of an electrically conductive material. In this way the grounding band to be in electrical communication with the bounce house. A ground wire is attachable to the grounding band such that the ground wire is in electrical communication with the inflation tube when the grounding band is positioned around the inflation tube. The ground wire is attachable to a ground to discharge static electricity from the bounce house.

8 Claims, 3 Drawing Sheets

BOUNCY CASTLE GROUNDING ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to grounding devices and more particularly pertains to a new grounding device for discharging static electricity from a bounce house. The device includes a bounce house with an inflation tube, a fan with an outlet chute and a grounding band. The grounding band is positioned around the inflation tube when the outlet chute is inserted into the inflation tube. Additionally, a ground wire is provided that is attachable between the grounding band and a ground for discharging static electricity from the bounce house into the ground.

(2) DESCRIPTION OF RELATED ART INCLUDING INFORMATION DISCLOSED UNDER 37 CFR 1.97 AND 1.98

The prior art relates to grounding devices including a grounding device for grounding adjacent structures which includes a sleeve filled with a dielectric, a ground rod extending outwardly from the dielectric and a ground wire extending outwardly from the dielectric. The prior art discloses an adhesive tape with electrical conductors being integrated into the adhesive tape for establishing low voltage connections. The prior art discloses an electrically conductive strap for grounding an object to a ground. The prior art discloses a wrist strap which is attachable to a work surface for grounding a user to the work surface. The prior art discloses a conductive, pressure sensitive adhesive tape. The prior art discloses a sleeve which includes a lacing that is electrically

(h) BRIEF SUMMARY OF THE INVENTION

An embodiment of the disclosure meets the needs presented above by generally comprising a bounce house which has an inflation tube for inflating the bounce house. A fan is fluidly attachable to the inflation tube to blow air into the bounce house for inflating the bounce house. A grounding band is positionable around the inflation tube and the grounding band is comprised of an electrically conductive material. In this way the grounding band to be in electrical communication with the bounce house. A ground wire is attachable to the grounding band such that the ground wire is in electrical communication with the inflation tube when the grounding band is positioned around the inflation tube. The ground wire is attachable to a ground to discharge static electricity from the bounce house.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
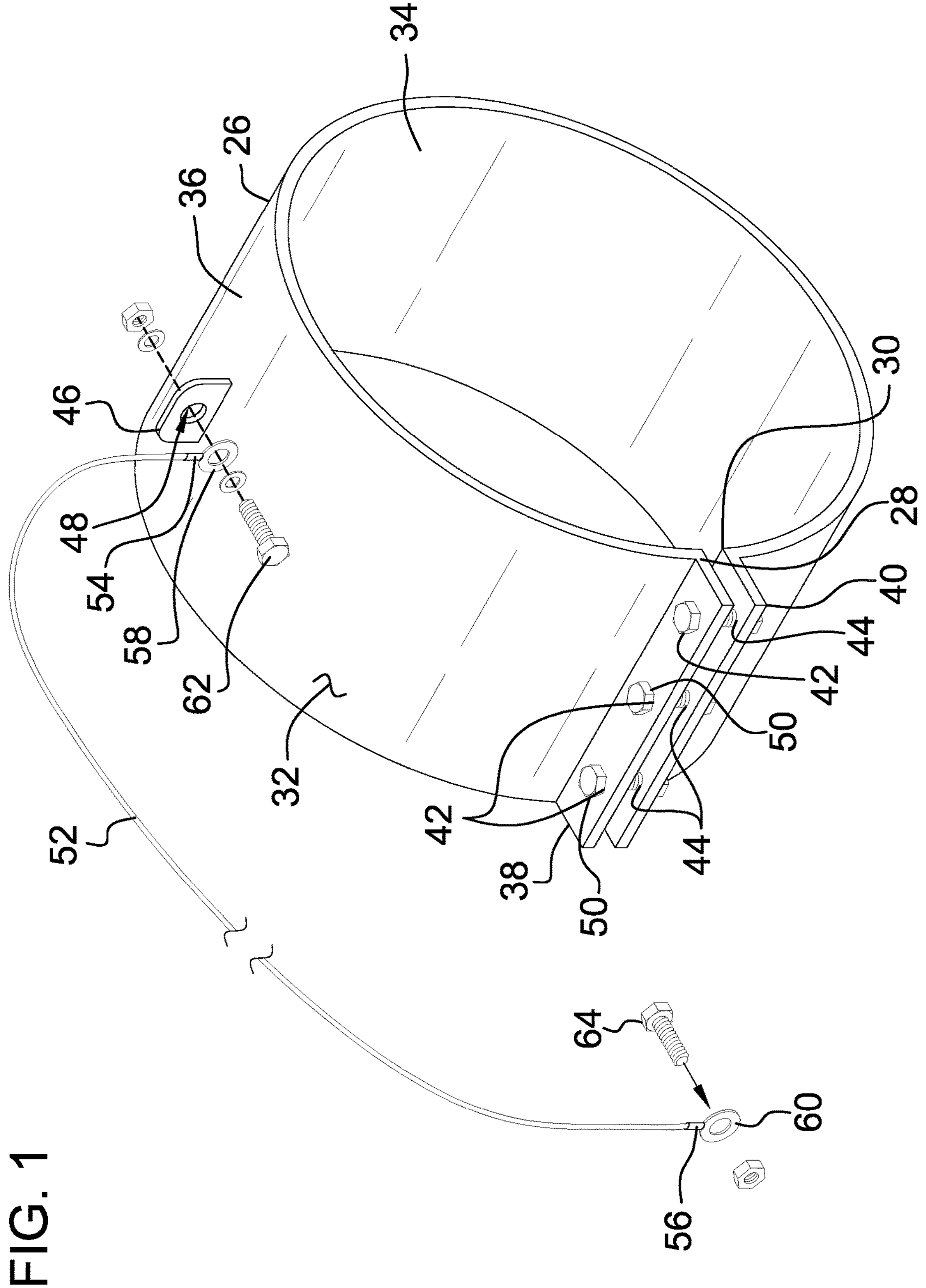
FIG. 1 is a perspective view of a grounding band of an embodiment of the disclosure.
Figure 2:
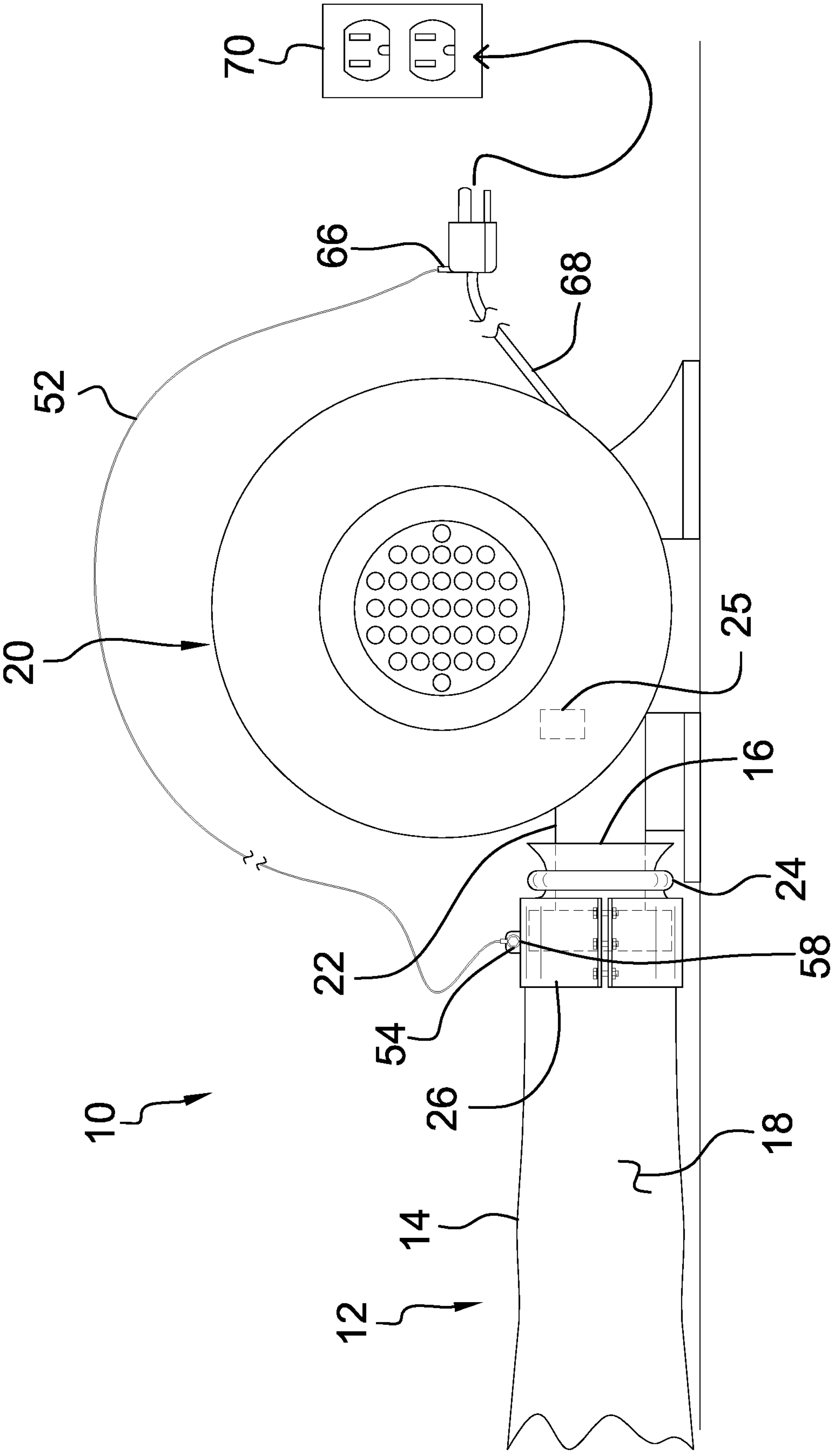
FIG. 2 is a perspective view of a bouncy castle grounding assembly according to an embodiment of the disclosure.
Figure 3:
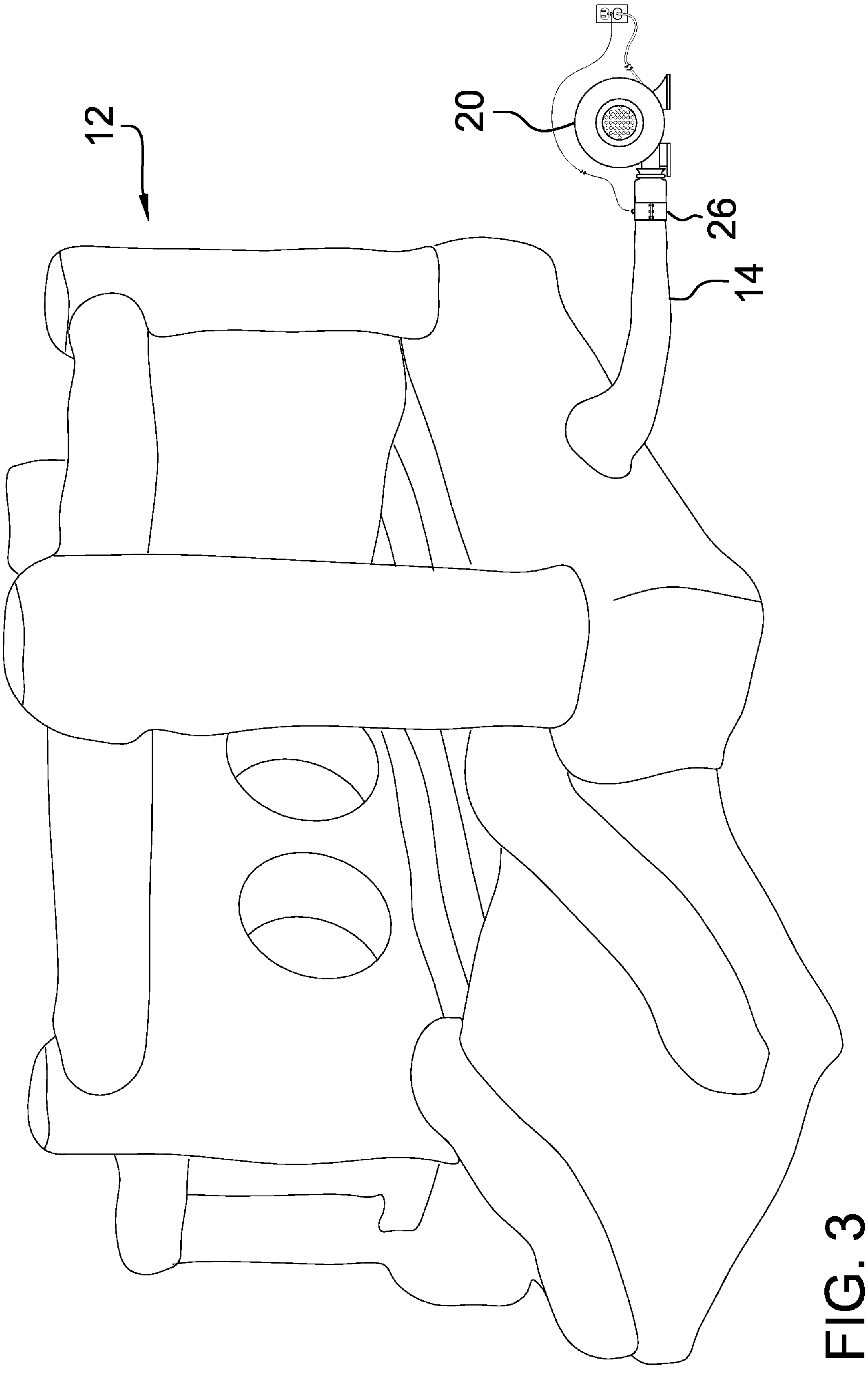
FIG. 3 is a perspective in-use view of an embodiment of the disclosure.

With reference now to the drawings, and in particular to FIGS. 1 through 3 thereof, a new grounding device embodying the principles and concepts of an embodiment of the disclosure and generally designated by the reference numeral 10 will be described.

As best illustrated in FIGS. 1 through 3, the bouncy castle grounding assembly 10 generally comprises a bounce house 12 that has an inflation tube 14 for inflating the bounce house 12; the inflation tube 14 has a distal end 16 and an outer surface 18 the distal end 16 is open. The bounce house 12 may be an inflatable bounce house 12 of any conventional design that would commonly be rented for birthday parties or other outdoor celebrations. A fan 20 is provided that is fluidly attachable to the inflation tube 14 to blow air into the bounce house 12 for inflating the bounce house 12. The fan 20 has an outlet chute 22 and the outlet chute 22 is insertable into the distal end 16 of inflation tube 14. A band 24 is positionable around the outer surface 18 of the inflation tube 14 when the outlet chute 22 is inserted into the inflation tube 14. Furthermore, the band 24 is comprised of an elastomeric material to compress the inflation tube 14 around the outlet chute 22 for retaining the inflation tube 14 on the outlet chute 22. The fan 20 might include an air pressure sensor 25 that senses air pressure within the bounce house 12 to sense air pressure within the bounce house 12. The fan 20 might be turned off when the air pressure sensor 25 does not sense rapid changes in air pressure that would indicate that occupants are not jumping in the bounce house 12.

A grounding band 26 is provided which is positionable around the inflation tube 14. The grounding band 26 is comprised of an electrically conductive material thereby facilitating the grounding band 26 to be in electrical communication with the bounce house 12. The grounding band 26 has a first end 28, a second end 30 and an outer surface 32 extending between the first end 28 and the second end 30, and the first end 28 is spaced from the second end 30 such that the grounding band 26 forms an open loop. The outer surface 32 has an inner side 34 and an outer side 36. The grounding band 26 has a first lip 38 extending away from the outer side 36 and the first lip 38 extends along the first end 28. The grounding band 26 has a second lip 40 extending away from the outer side 36 and the second lip 40 extends along the second end 30.

The first lip 38 has a plurality of first holes 42 each extending through the first lip 38 and the second lip 40 has a plurality of second holes 44 each extending through the second lip 40. Each of the second holes 44 is aligned with a respective one of the first holes 42. The inner side 34 of the outer surface 18 of the grounding band 26 abuts the outer surface 18 of the inflation tube 14 when the grounding band 26 is positioned around the inflation tube 14 having the first lip 38 abutting the second lip 40. The outer side 36 of the outer surface 18 of the grounding band 26 has a tab 46 extending away from the outer side 36. The tab 46 has an opening 48 extending through the tab 46, the tab 46 is positioned between the first lip 38 and the second lip 40, and the tab 46 is oriented to lie on a plane that is oriented coplanar with the first lip 38.

A plurality of first fasteners 50 is provided and each of the first fasteners 50 is extendable through a respective pair of the first holes 42 and the second holes 44 when the grounding band 26 is positioned around the inflation tube 14. Each of the first fasteners 50 compresses the first lip 38 against the second lip 40 for tightening the grounding band 26 around the inflation tube 14. Each of the first fasteners 50 may comprise a nut and bolt or other type of releasable, mechanical fastener. Alternatively, the grounding band 26 may include quick disconnects to facilitate the first end 28 of the grounding band 26 to be quickly attached or released from the second end 30 of the grounding band 26.

A ground wire 52 is attachable to the grounding band 26 such that the ground wire 52 is in electrical communication with the inflation tube 14 when the grounding band 26 is positioned around the inflation tube 14. The ground wire 52 has a first end 54 and a second end 56, and the ground wire 52 may comprise an insulated conductor. A first ring 58 is electrically coupled to the first end 28 and the first ring 58 is comprised of an electrically conductive material. A second ring 60 is electrically coupled to the second end 30 and the second ring 60 is comprised of an electrically conductive material. The ground wire 52 may have quick disconnects integrated into a respective first end 54 and second end 56 of the ground wire 52 to facilitate connecting and disconnecting the ground wire 52.

A second fastener 62 is extendable through the first ring 58 and the opening 48 in the tab 46 for attaching the first ring 58 to the tab 46. A third fastener 64 is extendable through the second ring 60 and engages a ground 66 thereby placing the bounce house 12 in electrical communication with the ground 66. In this way the ground wire 52 discharges static electricity from the bound house 12 into the ground 66. The ground 66 is integrated into a power cord 68 of the fan 20 such that the ground 66 is in electrical communication with a ground of a female electrical outlet 70 to which the power cord 68 is attached. In this way the bounce house 12 can be grounded to the female electrical outlet 70 to discharge static electricity into the female electrical outlet 70.

A roll of conductive tape 72 is provided and the roll of conductive tape 72 is comprised of an electrically conductive material. A selected length of the conductive tape 72 can be cut from the roll and positioned along the inflation tube 14 such that the conductive tape 72 is in electrical communication with the inflation tube 14. Furthermore, the length of the conductive tape 72 can be positioned either on the outside of the inflation tube 14 or the inside of the inflation tube 14, depending on the user's preference. The grounding band 26 may be an integral component of the fan 20 and the ground wire 52 can be coupled between the grounding band 26 and the length of the conductive tape 72 to ground the bounce hose 12 to the female electrical outlet 70. Alternatively, the ground wire 52 might be woven into the bounce house 12 to facilitate the bounce house 12 to be grounded to the fan 20 without the need of conductive tape 72. The conductive tape 72 might include a grommet to facilitate the ground wire 52 to be coupled to the conductive tape 72. The ground wire 52 could potentially be coupled between the conductive tape 72 and the female electrical outlet 70 thereby eliminating the need to position the grounding band 26 around the inflation tube 14. Furthermore, both the conductive tape 72 and the grounding band 26 can be simultaneously employed, depending on the user's preference.

In use, the outlet chute 22 of the fan 20 is inserted into the inflation tube 14, the band 24 is positioned around the inflation tube 14 and the grounding band 26 is positioned around the inflation tube 14. The ground wire 52 is attached to the tab 46 and the ground 66 and the fan 20 is turned on. In this way static electricity that is generated in the bounce house 12 due to friction of air molecules on the inflation tube 14 during inflation is discharged into the ground 66. Thus, users of the bounce house 12 will not receive shocks from static electricity when the users enter or exit the bounce house 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bouncy castle grounding assembly for grounding a bounce house when the bounce house is inflated, said assembly comprising:
- a bounce house having an inflation tube for inflating said bounce house;
- a fan being fluidly attachable to said inflation tube wherein said fan is configured to blow air into said bounce house for inflating said bounce house;
- a grounding band being positionable around said inflation tube, said grounding band being comprised of an electrically conductive material thereby facilitating said grounding band to be in electrical communication with said bounce house; and
- a ground wire being attachable to said grounding band such that said ground wire is in electrical communication with said inflation tube when said grounding band is positioned around said inflation tube, said ground wire being attachable to a ground wherein said ground wire is configured to discharge static electricity from said bounce house.

2. The assembly according to claim 1, wherein:
- said inflation tube has a distal end and an outer surface said distal end being open;
- said fan has an outlet chute, said outlet chute being insertable into said distal end of inflation tube; and
- said assembly includes a band being positionable around said outer surface of said inflation tube when said outlet chute is inserted into said inflation tube, said band being comprised of an elastomeric material thereby facilitating said band to compress said inflation tube around said outlet chute for retaining said inflation tube on said outlet chute.

3. The assembly according to claim 2, wherein:
- said grounding band has a first end, a second end and an outer surface extending between said first end and said second end, said first end being spaced from said second end such that said grounding band forms an open loop, said outer surface having an inner side and an outer side;
- said grounding band has a first lip extending away from said outer side, said first lip extending along said first end;
- said grounding band has a second lip extending away from said outer side, said second lip extending along said second end;
- said first lip has a plurality of first holes each extending through said first lip;
- said second lip has a plurality of second holes each extending through said second lip, each of said second holes being aligned with a respective one of said first holes;
- said inner side abuts said outer surface of said inflation tube when said grounding band is positioned around said inflation tube having said first lip abutting said second lip; and
- said outer side has a tab extending away from said outer side, said tab having an opening extending through said tab, said tab being positioned between said first lip and said second lip, said tab being oriented to lie on a plane being oriented coplanar with said first lip.

4. The assembly according to claim 3, further comprising a plurality of first fasteners, each of said first fasteners being extendable through a respective pair of said first holes and said second holes when said grounding band is positioned around said inflation tube, each of said first fasteners compressing said first lip against said second lip for tightening said grounding band around said inflation tube.

5. The assembly according to claim 1, wherein said ground wire has a first end and a second end, said first end having a first ring being electrically coupled to said first end, said first ring being comprised of an electrically conductive material, said second end having a second ring being electrically coupled to said second end, said second ring being comprised of an electrically conductive material.

6. The assembly according to claim 5, wherein:
- said grounding band includes a tab being coupled to said grounding band, said tab having an opening extending through said tab;
- a second fastener being extendable through said first ring and said opening in said tab for attaching said first ring to said tab; and
- a third fastener being extendable through said second ring and engaging a ground thereby placing said bounce house in electrical communication with the ground wherein said ground is configured to discharge static electricity into the ground.

7. A bouncy castle grounding assembly for grounding a bounce house when the bounce house is inflated, said assembly comprising:
- a bounce house having an inflation tube for inflating said bounce house, said inflation tube having a distal end and an outer surface said distal end being open;
- a fan being fluidly attachable to said inflation tube wherein said fan is configured to blow air into said bounce house for inflating said bounce house, said fan having an outlet chute, said outlet chute being insertable into said distal end of inflation tube;
- a band being positionable around said outer surface of said inflation tube when said outlet chute is inserted into said inflation tube, said band being comprised of an elastomeric material thereby facilitating said band to compress said inflation tube around said outlet chute for retaining said inflation tube on said outlet chute;
- a grounding band being positionable around said inflation tube, said grounding band being comprised of an electrically conductive material thereby facilitating said grounding band to be in electrical communication with said bounce house, said grounding band having a first end, a second end and an outer surface extending between said first end and said second end, said first end being spaced from said second end such that said grounding band forms an open loop, said outer surface having an inner side and an outer side, said grounding band having a first lip extending away from said outer side, said first lip extending along said first end, said grounding band having a second lip extending away from said outer side, said second lip extending along said second end, said first lip having a plurality of first holes each extending through said first lip, said second lip having a plurality of second holes each extending through said second lip, each of said second holes being aligned with a respective one of said first holes, said inner side abutting said outer surface of said inflation tube when said grounding band is positioned around said inflation tube having said first lip abutting said second lip, said outer side having a tab extending away from said outer side, said tab having an opening extending through said tab, said being positioned between said first lip and said second lip, said tab being oriented to lie on a plane being oriented coplanar with said first lip;

a plurality of first fasteners, each of said first fasteners being extendable through a respective pair of said first holes and said second holes when said grounding band is positioned around said inflation tube, each of said first fasteners compressing said first lip against said second lip for tightening said grounding band around said inflation tube;

a ground wire being attachable to said grounding band such that said ground wire is in electrical communication with said inflation tube when said grounding band is positioned around said inflation tube, said ground wire having a first end and a second end, said first end having a first ring being electrically coupled to said first end, said first ring being comprised of an electrically conductive material, said second end having a second ring being electrically coupled to said second end, said second ring being comprised of an electrically conductive material;

a second fastener being extendable through said first ring and said opening in said tab for attaching said first ring to said tab; and a third fastener being extendable through said second ring and engaging a ground thereby placing said bounce house in electrical communication with the ground wherein said ground is configured to discharge static electricity into the ground.

8. A method of discharging static electricity from a bounce house when the bounce house is inflated, the steps of the method comprising:

providing a bounce house having an inflation tube;

providing a fan having an outlet chute;

providing a grounding band;

providing a ground wire;

inserting said outlet chute into said inflation tube;

positioning said grounding band around said inflation tube when said outlet chute is inserted into said inflation tube; and attaching said ground wire between said grounding band and a ground thereby facilitating said ground wire to discharge static electricity in said bounce house into the ground.

* * * * *